UNITED STATES PATENT OFFICE.

WILLIAM P. D. MOROSS, OF CHATTANOOGA, TENNESSEE.

HYDRAULIC-CEMENT AND WATER PAINT.

1,036,506.  Specification of Letters Patent.  Patented Aug. 20, 1912.

Application filed August 14, 1911.  Serial No. 644,046.

*To all whom it may concern:*

Be it known that I, WILLIAM P. D. Moross, a citizen of the United States, residing at Chattanooga, in the county of Hamilton and State of Tennessee, have invented new and useful Improvements in Hydraulic-Cement and Water Paint, of which the following is a specification.

My invention relates to the composition of paints which may be put in the form of a dry powder, and be made ready for use by mixing with water, and particularly to a paint in which the main ingredient is hydraulic cement and which will set and harden into a firm, compact, and non-shrinking surface.

One object of my invention is to provide a paint having hydraulic properties in its nature and activity, and which, when applied to concrete, stucco, brick, stone, iron or steel, or other surfaces, will spread an even film thereover, and, because of its finely divided state, will enter into the pores and rough places in the surface coated and adhere thereto, and by absorbing moisture from the air and from the object coated, and by the water used in mixing, will set and harden into a firm and compact coating. By reason of the fact that it is practically insoluble in water, and resists to a great extent, if not altogether, the corrosive effects of the ordinary gases present in the atmosphere, as well as being non-corrosive itself, the coating thoroughly protects the material or object coated and when applied to iron or steel operates to prevent rust.

Another important object of my invention is to provide a paint having the above-mentioned characteristics, which will be practically free from shrinkage in setting, as free as possible from checking, or, as it is sometimes termed "alligatoring", and yet have sufficient elasticity to accommodate itself as much as possible to any contraction or expansion of the object coated without necessarily cracking.

My invention and the manner of using the same will be understood from the following description.

The principal ingredient or base of my paint is hydraulic cement, either natural or Portland. This must be reground and separated or reduced by mechanical means to a greater degree of fineness than can ordinarily be obtained commercially. The particles must be of such fineness that they will pass through a No. 200 mesh standard sieve, its composition remaining unchanged. To this base is added, in proper proportion, silica, quartz sand, or other suitable silicious matter, similarly pulverized and prepared; or if preferred, limestone dust, whiting, or other forms of calcium carbonate or other mineral, similarly reduced to a great degree of fineness, either in whole or in part may be used. There is also added pulverized actinolite, asbestos, or other form of hydrous magnesium silicate, and a small percentage of ground kaolin and hydrated lime, preferably hydrated hydraulic lime.

The ingredients above specified are mixed in proportions of about 55 to 60 per cent. of the cement, prepared as above specified, with about 5 per cent. of the hydrated lime and 5 per cent. of the ground kaolin, to which is added about equal proportions of pulverized actinolite and pulverized silica, or some form of calcium carbonate or other pulverized mineral. A small proportion of prepared casein or glutinous matter may be added which will assist in the spreading and initial adhesiveness of the applied paint, and likewise any suitable coloring matter or pigment may be incorporated to give the desired shade or color.

It is to be understood that while I have stated the preferred proportions of the several ingredients of my composition, yet these may be varied to suit particular conditions, both of the cement used as a base, and of the other ingredients, in order to secure the best results. The materials are mixed by any suitable mechanical or other means until thoroughly blended, and the composition is then packed in suitable receptacles ready for use.

To prepare the paint for use, a quantity of the composition is mixed with water in a bucket or other suitable vessel and stirred until the resulting liquid is about the consistency of buttermilk, when it is ready for application to the surface to be covered by means of a brush or spray in the ordinary manner.

The advantages possessed by my composition will now be appreciated by those skilled in this art. The pulverized calcium carbonates or pulverized silica, or both, provide a filler material with which the crystals or colloids in the setting of the cement, will take hold and unite to prevent cracking through shrinkage, which might otherwise occur. The asbestos or actinolite, being of a more fibrous nature, while serving similarly as a filler, will impart additional elasticity to the paint when set. The kaolin assists in the spreading and covering capacity of the paint, and is not to be employed in sufficient quantity to be deleterious to the setting of the cement, while the hydrated lime acts very similarly, with the additional property of assisting in preventing oxidation when used on iron or steel. It will be understood that the nature of my paint, being free from sulfates, causes it to be non-corrosive and lasting.

I claim:—

1. An hydraulic cement and water paint, comprising cement and a filler comprising pulverized silicious matter, asbestos, and kaolin.

2. An hydraulic cement and water paint, comprising cement and a filler comprising pulverized silicious matter, asbestos, kaolin, and hydrated lime.

3. An hydraulic cement and water paint, comprising cement, a finely ground colloidal amorphous mineral filler, a fibrous mineral filler, and clay.

4. An hydraulic cement and water paint, comprising cement, a finely ground colloidal amorphous mineral filler, a fibrous mineral filler, hydrated lime, and clay.

5. An hydraulic cement and water paint, comprising cement and a filler comprising calcium carbonate, pulverized fibrous hydrous magnesium silicate, and kaolin.

6. An hydraulic cement and water paint, comprising cement and a filler comprising calcium carbonate, pulverized silica, pulverized fibrous hydrous magnesium silicate, kaolin, and hydrated lime.

7. A non-corrosive water paint, comprising the following ingredients in substantially the proportions specified, viz: 55 per cent. of cement, 5 per cent. of hydrated lime, 5 per cent. of ground kaolin, and equal proportions of pulverized fibrous actinolite and pulverized silica.

8. A non-corrosive water paint, comprising the following ingredients in substantially the proportions specified, viz: 55 per cent. of cement, 5 per cent. of hydrated lime, 5 per cent. of ground kaolin, a small proportion of prepared casein, and equal proportions of pulverized fibrous actinolite and pulverized silica.

In testimony whereof I have hereunto set my hand in presence of two subscribing witnesses.

WILLIAM P. D. MOROSS.

Witnesses:
E. De L. Wood,
C. W. Stooke.